(12) United States Patent
Wilson

(10) Patent No.: US 6,199,112 B1
(45) Date of Patent: Mar. 6, 2001

(54) SYSTEM AND METHOD FOR RESOLVING FIBRE CHANNEL DEVICE ADDRESSES ON A NETWORK USING THE DEVICE'S FULLY QUALIFIED DOMAIN NAME

(75) Inventor: Stephen K. Wilson, Austin, TX (US)

(73) Assignee: Crossroads Systems, Inc., Austin, TX (US)

(*) Notice: Subject to any disclaimer, the term of this patent is extended or adjusted under 35 U.S.C. 154(b) by 0 days.

(21) Appl. No.: 09/158,991

(22) Filed: Sep. 23, 1998

(51) Int. Cl.[7] .......................... G06F 15/16; G06F 15/173
(52) U.S. Cl. ..................... 709/227; 709/222; 709/226; 709/245; 710/9; 710/129; 359/118; 340/475
(58) Field of Search ..................... 709/222, 226, 709/227, 245; 710/129, 9; 359/118; 340/825, 825.52, 825.53; 370/475

(56) References Cited

U.S. PATENT DOCUMENTS

| | | | |
|---|---|---|---|
| 5,351,146 | * 9/1994 | Chan et al. | 359/118 |
| 5,774,660 | * 6/1998 | Brendel et al. | 709/201 |
| 5,812,754 | * 9/1999 | Lui et al. | 714/6 |
| 5,815,664 | * 9/1998 | Asano | 709/227 |
| 5,835,723 | * 11/1998 | Andrews et al. | 709/226 |
| 5,854,901 | * 12/1998 | Cole et al. | 709/245 |
| 5,894,479 | * 4/1999 | Mohammed | 370/401 |
| 5,941,972 | * 8/1999 | Hoese et al. | 710/129 |
| 5,954,796 | * 9/1999 | McCarty et al. | 709/222 |
| 5,978,854 | * 11/1999 | Fujimori et al. | 709/245 |
| 6,006,272 | * 12/1999 | Aravamudan et al. | 709/245 |
| 6,061,739 | * 5/2000 | Reed et al. | 709/245 |

OTHER PUBLICATIONS

D. Plummer, "An Ethernet Address Resolution Protocol", Network Group—RFC, No. 826, Nov. 1982, pp. 1–8.*
Finlayson et al., "A Reverse Address Resolution Protocol", Network Working Group—RFC, No. 903, Jun. 1984, pp. 1–4.*

* cited by examiner

Primary Examiner—Mark H. Rinehart
Assistant Examiner—Paul Kang
(74) Attorney, Agent, or Firm—Gray Cary Ware & Freidenrich, LLP

(57) ABSTRACT

A method and system for discovering the location of a storage router, and therefore the attached storage devices, in a fibre channel network using the storage router's fully qualified domain name to ultimately determine the storage router's arbitrated loop physical address (AL_PA). An Internet protocol domain name query containing the fully qualified domain name is sent from a host computer over the storage area network to a domain name server to determine an Internet Protocol address for the storage router. The domain name server replies with the storage router Internet Protocol address. The host computer then sends an address resolution protocol request containing the Internet protocol address over the storage area network to determine a node name for the storage router. The storage router replies with its node name. The host computer then sends an FCP request containing the storage router's node name over the storage area network to determine an arbitrated loop physical address of the storage router. The storage router replies with its arbitrated loop physical address. The host computer can use a variety of standard inquiries discover storage devices attached to the storage router. The communication can then continue in fibre channel protocol between the storage and the host computer.

25 Claims, 1 Drawing Sheet

SYSTEM AND METHOD FOR RESOLVING FIBRE CHANNEL DEVICE ADDRESSES ON A NETWORK USING THE DEVICE'S FULLY QUALIFIED DOMAIN NAME

TECHNICAL FIELD OF THE INVENTION

The present invention relates generally to computer systems and methods, and more particularly, to a system and method for determining a fibre channel device address on a storage network using the device's fully qualified domain name.

BACKGROUND OF THE INVENTION

Fibre channel is the name of an integrated set of standards being developed by the American National Standards Institute (ANSI). Fibre channel is a hybrid channel and networking data transport medium.

Fibre channel topology can be selected depending on system performance requirements or packaging options. Possible fibre channel topologies include point-to-point, crosspoint switched or arbitrated loop. In any of these fibre channel topologies, SCSI storage devices, such as hard disk storage devices and tape devices, can be used to store data that can be retrieved by a software application. In order to save or retrieve data from any particular storage device, that device must first be located.

Conventionally, fibre channel storage devices have been directly attached to a fibre channel I/O bus on a server. Thus, to discover the SCSI device, the server with an application on it can scan its fiber channel I/O buses to discover what storage devices are attached and the application can determine whether the storage device is compatible with the application.

With the relatively recent development of storage area networks incorporating storage routers, locating both the router and storage devices associated with that router presents some challenges. In a storage area network, the I/O bus is geographically distributed throughout the storage area network. Storage routers, to which the storage devices can be locally attached, can be moved from one physical location to another depending on the needs at various times. This change in physical location of storage routers (and thus change in physical addresses) presents problems in locating both the storage router and storage devices in the storage area network.

SUMMARY OF THE INVENTION

The present invention provides a system and method for discovering a fibre channel device in a network that substantially eliminates or reduces disadvantages and problems associated with previously developed discovery systems and methods.

More specifically, the present invention provides a system for determining a fibre channel device address on a storage network using the device's fully qualified domain name. To accomplish the fibre channel device discovery, a domain name query is sent from a host computer to a domain name server that includes the fully qualified domain name of the device (such as a storage router) in order to obtain the Internet Protocol address for the storage router. After locating the Internet Protocol address for the storage router based on the fully qualified domain name, the domain name server will send the storage router's Internet Protocol address to the host computer. The host computer then sends an address resolution protocol request containing the storage router's Internet protocol address over the storage area network to determine a node name for the storage router. The storage router gets the request and responds with an address resolution protocol reply containing its node name to the host computer. The host computer sends a fibre channel address resolution protocol request containing the storage router node name to the storage router to determine the router's physical address. The storage router responds with a fibre channel address resolution protocol reply containing the storage router's physical address to the host computer.

The invention can then be used to discover storage devices attached to the storage router. After the storage router physical address is located, an inquiry can be made to determine the physical address of the storage devices, and whether the storage devices are compatible with the client application accessing the storage devices.

The present invention provides an important technical advantage by discovering the fibre channel address (a storage or FCP/SCSI protocol) of a storage router using the storage router's fully qualified domain name (a networking or IP protocol).

The present invention provides another technical advantage by facilitating the discovery of a fibre channel storage device in a storage area network that is compatible with an application using the fully qualified domain name of the storage router to which that storage device is locally attached.

The present invention provides another technical advantage by allowing a server to locate a particular fibre channel device in a storage area network even if the storage router to which the device is attached has changed physical location.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs, like numerals being used to refer to like and corresponding parts of the various drawings.

Fibre channel can support both Internet protocol (IP) or small computer system interface (SCSI)/fibre channel protocol (FCP). The present invention uses a storage router's fully qualified domain name (IP) to discover the address of the storage router in order to locate and use a storage device attached to the storage router within a storage area network using fibre channel.

In a fibre channel storage area network, each storage router has an arbitrated loop physical address (AL_PA) which is an FCP address. However, the AL_PA can change each time a device is inserted into the arbitrated loop or a loop initialization occurs. Thus, the AL_PA is a dynamic address. The AL_PA of a storage router must be discovered in order to communicate from the server to that storage router. In addition, every fibre channel device, such as a storage router, has an organizationally unique fully qualified domain name and IP address associated with it. Unlike the AL_PA, the fully qualified domain name and IP addresses are static addresses that do not change. Thus, a particular storage router will always have the same fully qualified domain name and IP address, but the AL_PA associated with the storage router can change. However, once the AL_PA of a storage router is known, a client application on a host computer can locate any storage devices associated with that storage router.

Figure 1:
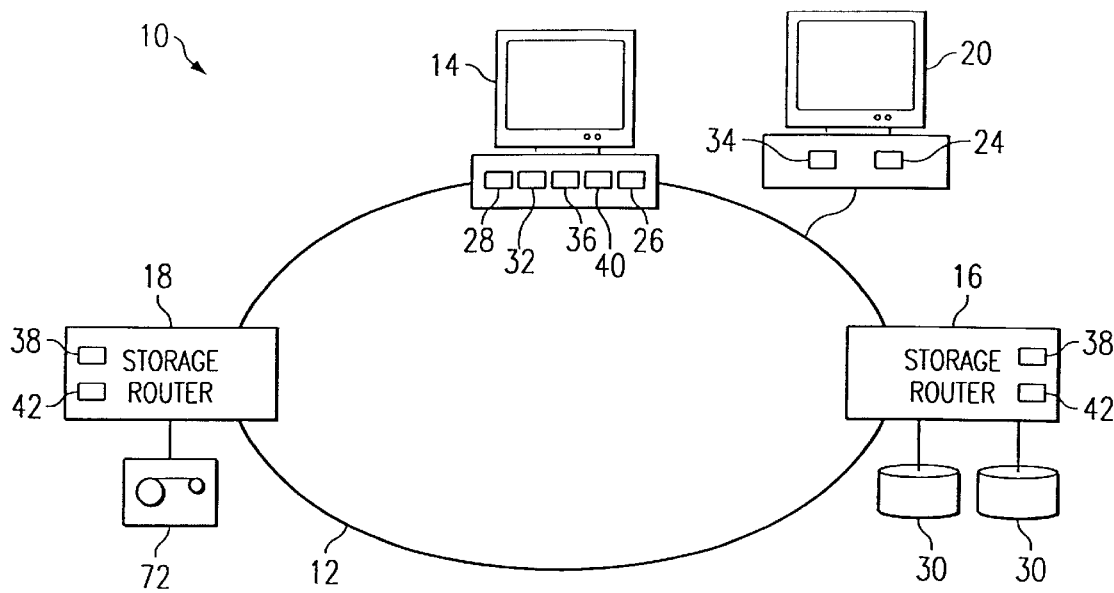
FIG. 1 shows an exemplary storage area network incorporating an embodiment of the present invention.

FIG. 1 shows an exemplary fibre channel storage area network 10 containing an arbitrated loop 12 connecting a host computer 14, a first storage router 16 and a second storage router 18. A domain name service server 20 (or dns server) is fibre channel attached to the storage area network 10. Storage devices 30 are directly attached to storage router 16, while storage device 72 is directly attached to storage router 18. As shown in FIG. 1, storage devices 30 are SCSI hard disk devices while storage device 72 is a SCSI tape drive to provide the storage capability of the storage area network.

Storage routers 16 and 18 include a processor for executing software programs and memory for storing software programs and data files. The storage router used in conjunction with the present invention must support at least two protocols on its Fibre Channel interface connected to the storage area network: Fibre Channel Protocol (which is SCSI encapsulated over fibre channel), which can be used by the host computer to discover and communicate with SCSI storage devices attached to the storage router, and Address Resolution Protocol (ARP)/Fibre Channel Address Resolution Protocol (FARP), which can be used by the host to discover the location, or fibre channel address, of the storage router.

The dns server 20 contains a record resource look-up table 24 of fully qualified domain names correlating to IP addresses for devices on the network 10. The host computer 14 can contain a device name file 26 of fully qualified domain names for storage routers on the storage area network 10. Further, a client application 28 resident on or accessible by the host computer 14 can optionally include the fully qualified domain name for each storage device locally attached to each storage router it wishes to access. For example, with reference to FIG. 1, storage router 16 could have a fully qualified domain name of "clarion.hp-.com" and storage router 18 could have a fully qualified domain name of "redwood1.crossroads.com". Tape drive 72 is connected to storage router 18, or "redwood1.crossroads.com", and the device name file 26 would identify tape drive 72 with storage router 18. Likewise, hard disk storage devices 30 would be associated with storage router 16, or "clarion.hp.com" on the host name file 26.

The present invention will be described using the exemplary arbitrated loop fibre channel topology as shown in FIG. 1. It should be understood that the present invention is equally applicable to other fibre channel topologies. It should further be understood that additional arbitrated loops having additional storage router(s) and additional storage device(s) could be part of the storage area network 10. It should be further understood that the present invention can work to discover either native SCSI or fibre channel storage devices behind a storage router.

In order to communicate with a Fibre Channel device, such as a storage router, the host computer must be FCP compatible and needs to discover the AL_PA for the device. The host computer 14 communicates with SCSI storage devices 30 and 72 through the storage routers 16 and 18, respectively. The storage device's AL_PA can be determined if the AL_PA of the storage router is known. A storage router is addressable on its Fibre Channel interface by its IP address that is saved in the storage router memory. These IP addresses are generated using standard Internet IP address acquisition techniques, currently through InterNic. This IP address for the storage router is saved as a resource record in resource record look-up table 24 on the dns server 20 connected to the storage area network 10.

Host computer 14 in FIG. 1 may need access to any of the storage devices 30 and 72 in the storage area network 10. However, the host computer 14 must obtain or discover the location of that particular storage device. With the present invention, the host computer 14 utilizes both IP and FCP to first discover the location of the storage router associated with the storage device desired based on that storage router's fully qualified domain name. The present invention does this by acquiring and translating from the storage router IP address to the storage router's node name and from node name to AL_PA. The host computer 14 can then perform a standard inquiry to determine the storage devices connected to that router to allow the host computer to communicate with a compatible storage device.

Figure 2:
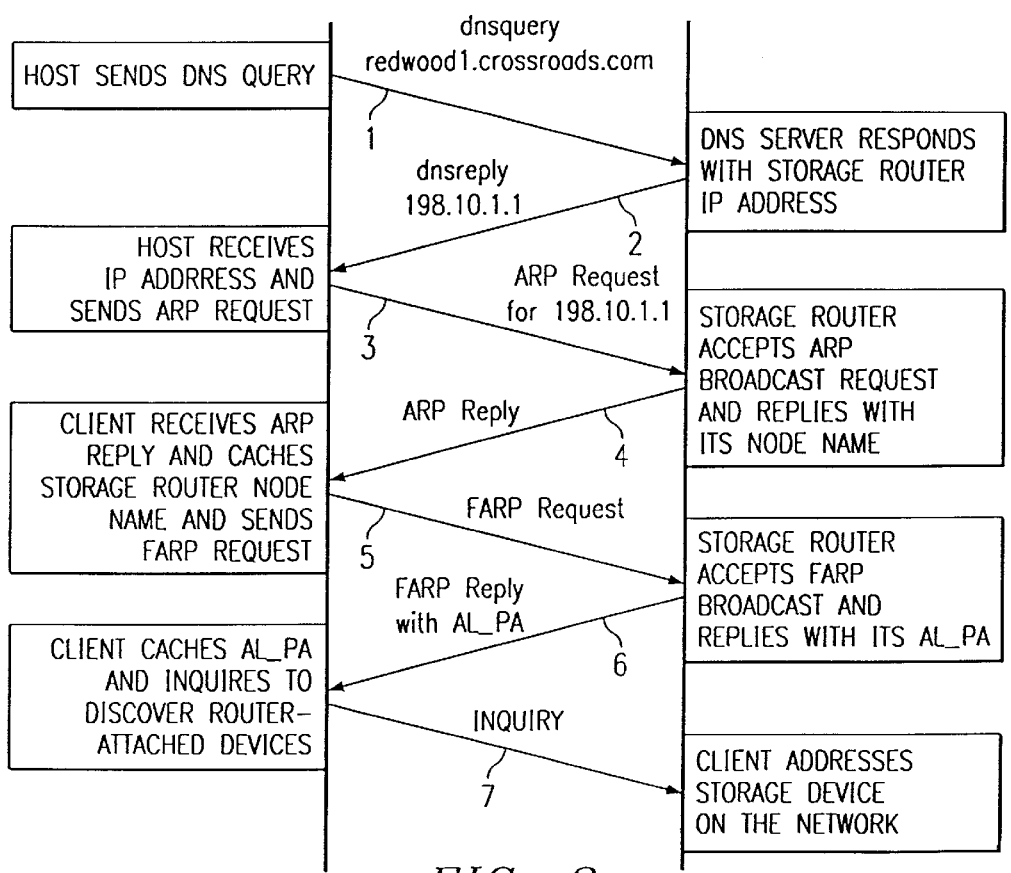
FIG. 2 is a flow diagram illustrating one embodiment of the method of discovering a fibre channel device's physical address from its fully qualified domain name.

With reference to FIG. 2, a description of how the host computer 14 can discover a storage device location based on the storage router's fully qualified domain name is provided. At step 1, a dns query software program 32 resident on the host computer 14 sends a query to the dns server 20 requesting a response as to what storage router has a particular fully qualified domain name. For example, if storage router 18 has the fully qualified domain name, "redwood1.crossroads.com", then the dns request for fully qualified domain name "redwood1.crossroads.com" will be a request for the IP address of storage router 18. As discussed above, the fully qualified domain name is a static address, while the AL_PA is a dynamic name. While the client application knows the fully qualified domain name of the storage router in the storage area network, the current AL_PA for that storage router will not necessarily be known. The dns query would be in traditional Internet protocol that would be sent out over the fibre channel host bus adapter. The fibre channel host bus adapter at the dns server 20 can receive and process both IP and ARP/FARP messages.

The dns server 20 has a look-up table 24 of resource records that correlates fully qualified domain names to IP addresses for storage routers on the arbitrated loop 12. At step 2, the dns server 20 receives the dns query packet and replies to the host computer 14 with the IP address for storage router 18 using a dns reply software program 34 resident in memory on the dns server 20. At step 3, the host computer 14 receives the storage router's IP address and sends a broadcast address resolution protocol (ARP) request over the storage area network 10 that includes the IP address for storage router 18. The ARP request is sent by an ARP request software program 36 resident on or accessible by the host computer 14. This ARP request is a request to find the FC node name that matches the IP address sent in the request. In other words, this ARP request is designed to swap the storage router's IP address for the storage router's FC node name. Each fibre channel device has an organizationally unique FC node name. This unique FC node name (or world wide name) is currently defined to begin with an OUI (or organizationally unique identifier) and has an eight byte total length. It should be understood that the present invention can still accomplish its intended results based on any structure of unique FC node name.

At step 4, storage routers 16 and 18 in the storage area network 10 receive the ARP request with the IP address for storage router 18, and only storage router 18 (because it was the router matching that IP address) sends an ARP reply containing its FC node name. Only the particular storage router having the IP address in the ARP request will reply to the ARP request. The ARP reply can be sent using an ARP reply software program 38 resident on each storage router. The host computer 14 receives the ARP reply including the node name of storage router 18 and can cache the node name. The host computer 14 has now gone from the fully qualified domain name of the router to the router's FC node name.

At step 5, the host computer 14 sends a broadcast fibre channel address resolution protocol (FARP) request that includes the node name for storage router 18 to the storage area network 10 to request the AL_PA (or Port_ID) of storage router 18. This FARP request can be sent using a FARP request software program 40 resident on or accessible by the host computer 14. At step 6, storage router 18 sends a FARP reply using a FARP reply software program 42, the FARP reply including the storage router's 18 AL_PA (or Port ID) to the host 14. The host 14 has now discovered the AL_PA for storage router 18 from the router's fully qualified domain name. In this manner, the AL_PA for storage router 18 is discovered.

In an optional step 7, the host computer 14 can perform a number of known discovery methods (as defined in various SCSI specifications) to determine the physical locations of storage device 72 directly attached to the storage router 18. For example, the host computer 14 can issue inquiries to every AL_PA by walking through all possible luns (FCP_LUN) at each AL_PA, or a REPORT LUNS to discover storage device 72 attached to storage router 18 and determine whether the application is compatible with storage device 72. The AL_PA for storage router 16, and therefore, storage devices 30, can be discovered similarly. After the discovery of a compatible storage device 30 or 72 has occurred, the communication between the storage device and the application at the host computer can occur using FCP, rather than IP or some other protocol. If none of the storage devices locally attached to the storage router 18 are compatible, the host computer 14 could execute steps 1–7 again with storage router 16 and storage devices 30, or any other storage router on the storage area network 10.

It should be understood that the dns query software program 32, the ARP request software program 36, and the FARP request software program 40 can all comprise a single host software package accessible by the host computer and executed through the host computer 14 processor. Furthermore, each of these host software programs could be included in the client application 28 resident on the host computer 14. It should be further understood that the ARP reply software program 38 and the FARP reply software program 40 can comprise a single software package resident on the memory of the storage router.

As shown above, the storage router 18 supports IP, FCP, and ARP and FARP to allow the invention to resolve a storage router's AL_PA from the storage router's fully qualified domain name. In order to use the present invention to support SCSI legacy devices, the storage router must also support SCSI. As shown, the storage router can maintain the IP address of any SCSI storage device attached to its local SCSI interface (for example, storage devices 30 for storage router 18 and storage device 72 for storage router 16).

As a particular example, again referencing FIG. 2, the client application may need to access tape drive 72 attached to storage router 18 having a fully qualified domain name of redwoood1.crossroads.com. The dns query from the host 14 would request the IP address for the "redwood1.crossroads.com" storage router, which is storage router 18. The dns server 20 will reply to the host 14 with the storage router 18 IP address "198.10.1.1" which corresponded to the fully qualified domain name "redwood1.crossroads.com" on the dns server's resource record look-up table 24. The host 14 receives IP address "198.10.1.1" and sends a broadcast ARP request for the node name of the storage router having an IP address of "198.10.1.1". Storage router 18, having an IP address of "198.10.1.1", will respond to this message with an ARP reply that includes its unique eight byte node name. Host 14 receives the eight byte node name and sends a FARP request asking storage router 18 for its AL_PA. Storage router 18 will send a FARP reply with its AL_PA. Thus, the host 14 has discovered the physical address of storage router 18 from its fully qualified domain name. The application running on host 14 can now run a number of well-known inquiries to determine that tape drive 72 is attached to storage router 18, the location of tape drive 72 and whether it is compatible with tape drive 72. For example, the host 14 could issue a REPORT LUNS command, as defined by the SCSI specification, to identify and locate storage device 72. When the application determines that tape drive 72 is compatible, it can store and retrieve information on that tape drive 72.

Although the present invention has been described in detail, it should be understood that various changes, substitutions and alterations can be made hereto without departing from the spirit and scope of the invention as described by the appended claims.

What is claimed is:

1. A method for resolving a fibre channel device address on a network from a fully qualified domain name of a device, comprising:
    sending a domain name query containing the fully qualified domain name from a host computer over the network to a domain name server to determine an Internet Protocol address for the device;
    locating at the domain name server the Internet Protocol address for the device based on the fully qualified domain name;
    sending the device Internet Protocol address to the host computer;
    sending an address resolution protocol request containing the Internet protocol address from the host computer over the storage area network to determine a node name for the device;
    sending an address resolution protocol reply containing the device node name to the host computer;
    sending a fibre channel address resolution protocol request containing the device node name from the host computer to the device to determine a physical address of the device; and
    sending a fibre channel address resolution protocol reply containing the device physical address to the host computer.

2. The method of claim 1, wherein the device is a storage router capable of supporting both fibre channel protocol and address resolution protocol, and further wherein the network is a storage area network.

3. The method of claim 2, wherein the storage router has a fibre channel interface that is addressable by the Internet Protocol address.

4. The method of claim 2, further comprising sending a storage device inquiry from the host computer to the storage router to discover a storage device attached to the storage router.

5. The method of claim 4, further comprising:
determining from a reply to the storage device inquiry if the storage device is compatible with a client application resident on the host computer; and
if the storage device and client application are compatible, exchanging data between the storage device and the host computer.

6. The method of claim 5, wherein the data exchanging between the storage device and the host computer is accomplished using fibre channel protocol.

7. The method of claim 4, wherein the storage device inquiry discovers a plurality of storage devices.

8. The method of claim 4, wherein the device physical address is the arbitrated loop physical address for the storage device.

9. The method of claim 4, wherein each step of sending a request from the host computer is facilitated by the client application resident on the host computer.

10. The method of claim 4, wherein the storage device is directly attached to the storage router.

11. The method of claim 4, wherein the storage device is attached via an arbitrated loop to the storage router.

12. The method of claim 4, wherein discovering the storage device further comprises using a REPORT LUNS command as defined by the SCSI specification.

13. The method of claim 1, wherein the network is a storage area network.

14. The method of claim 1, wherein the domain name query and domain name reply are Internet protocol.

15. A method for resolving a fibre channel device address on a storage area network from a fully qualified domain name of a storage router capable of supporting both fibre channel protocol and address resolution protocol, comprising:
sending an Internet protocol domain name query containing the fully qualified domain name from a host computer over the storage area network to a domain name server to determine an Internet Protocol address for the storage router;
locating at the domain name server the Internet Protocol address for the storage router based on the fully qualified domain name;
sending an Internet protocol reply containing storage router Internet Protocol address from the domain name server to the host computer;
sending an address resolution protocol request containing the Internet protocol address from the host computer over the storage area network to determine a node name for the storage router;
sending an address resolution protocol reply containing the storage router node name to the host computer;
sending a fibre channel address resolution protocol request containing the device node name from the host computer to the storage router to determine an arbitrated loop physical address of the storage router; and
sending a fibre channel address resolution protocol reply containing the storage router arbitrated loop physical address to the host computer.

16. The method of claim 15, further comprising:
sending a storage device inquiry from the host computer to the storage router to discover a storage device attached to the storage router;
determining from a reply to the storage device inquiry if the storage device is compatible with the host computer; and
if the storage device and application are compatible, exchanging data between the storage device and the host computer using fibre channel protocol.

17. A system for resolving a fibre channel device address from a fully qualified domain name of a device in a storage area network, comprising:
a storage router, comprising a fibre channel interface that supports both fibre channel protocol and address resolution protocol;
a host computer capable of supporting Internet protocol and fibre channel protocol, the host computer comprising:
a client application; and
a data file containing a list of fully qualified domain names for each storage router in the storage area network; and
a domain name server comprising a resource record look-up table, wherein the resource record look-up table contains the Internet protocol address and fully qualified domain name of the storage router configured such that the Internet protocol address can be discovered from the fully qualified domain name, and wherein;
the client application is operable to access the data file and send a domain name query containing the fully qualified domain name for the storage router over the storage area network to the domain name server to determine the Internet Protocol address for the storage router;
the domain name server discovers the Internet Protocol address for the storage router based on the fully qualified domain name and sends the storage router Internet Protocol address to the client application;
the client application sends an address resolution protocol request containing the Internet protocol address over the storage area network to determine a node name for the storage router;
the storage router sends an address resolution protocol reply containing the storage router node name to the client application;
the client application sends a fibre channel address resolution protocol request containing the storage router node name to the storage router to determine a physical address of the storage router; and
the storage router sends a fibre channel address resolution protocol reply containing the device physical address to the client application.

18. The system of claim 17, further comprising at least one storage device attached to the storage router, and wherein the client application further sends a storage device inquiry to the storage router to discover a storage device attached to the storage router.

19. The system of claim 18, wherein the client application further determines from a reply to the storage device inquiry whether the storage device is compatible with the client application, and if the storage device and client application are compatible, exchanging data between the storage device and the host computer using fibre channel protocol.

20. The system of claim 19, wherein the storage device inquiry discovers a plurality of storage devices.

21. The system of claim 19, wherein discovering the storage device further comprises using a REPORT LUNS command as defined by the SCSI specification.

22. A system for resolving a storage router physical address from a fully qualified domain name of a storage router in a storage area network, comprising:

a host computer capable of supporting Internet protocol
and fibre channel protocol, comprising:
  a host processor;
  a host memory;
  a dns query software program resident on the host memory;
  an ARP request software program residing on the host memory; and
  a FARP request software program residing on the host memory;
a domain name server capable of supporting Internet protocol and fibre channel protocol, comprising:
  a domain name server processor;
  a domain name server memory;
  a resource record look-up table containing the Internet protocol address and fully qualified domain name of the storage router, such resource record look-up table configured in a way that the Internet protocol address can be discovered from the fully qualified domain name; and
  a dns reply software program resident on the domain name server memory; and
a storage router, comprising:
  a fibre channel interface that is addressable by the Internet Protocol address to allow support of both fibre channel protocol and address resolution protocol;
  a storage router processor;
  a storage router memory
  an ARP reply software program resident on the storage router memory; and
  a FARP reply software program resident on the storage router memory, and wherein:
    the dns query software program is operable to direct the host processor to send a domain name query containing the fully qualified domain name of the storage router over the storage area network to the domain name server;
    the dns reply software program is operable to direct the domain name server to access the resource record look-up table and discover the Internet Protocol address for the storage router based on the fully qualified domain name in the domain name query and to send a dns reply to the host computer that contains the storage router Internet Protocol address;
    the ARP request software program operable to direct the host processor to send an address resolution protocol request containing the storage router Internet protocol address over the storage area network to determine a node name for the storage router;
    the ARP reply software program operable to direct the storage router processor to send an address resolution protocol reply containing the storage router node name to the host computer;
    the FARP request software program operable to direct the host processor to send a fibre channel address resolution protocol request containing the storage router node name to the storage router to determine a physical address of the storage router; and
    the FARP reply software program operable to direct the storage router processor to send a fibre channel address resolution protocol reply containing the storage router physical address to the client application.

23. The system of claim 22, further comprising:
  a data file containing a list of fully qualified domain names for each storage router in the storage area network; and
  a client application resident on the host memory, the client application operable to direct the host processor to access the data file, obtain the fully qualified domain name of the storage router, and send the domain name query to the domain name server.

24. The system of claim 23, further comprising at least one storage device attached to the storage router, and wherein the client application further sends a storage device inquiry to the storage router to discover the storage device attached to the storage router.

25. The system of claim 24, wherein the client application further determines from a reply to the storage device inquiry whether the storage device is compatible with the client application, and if the storage device and client application are compatible, exchanging data between the storage device and the host computer using fibre channel protocol.

* * * * *